(12) United States Patent
Jun et al.

(10) Patent No.: US 8,092,719 B2
(45) Date of Patent: Jan. 10, 2012

(54) NANOCRYSTAL-METAL OXIDE COMPOSITES AND PREPARATION METHOD THEREOF

(75) Inventors: Shin Ae Jun, Seongnam-si (KR); Eun Joo Jang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 532 days.

(21) Appl. No.: 12/177,633

(22) Filed: Jul. 22, 2008

(65) Prior Publication Data

US 2009/0058264 A1 Mar. 5, 2009

(30) Foreign Application Priority Data

Sep. 4, 2007 (KR) .................. 10-2007-0089535
Nov. 9, 2007 (KR) .................. 10-2007-0114329

(51) Int. Cl.
- *H01B 1/04* (2006.01)
- *H01B 1/12* (2006.01)
- *B32B 9/00* (2006.01)
- *H01J 63/04* (2006.01)

(52) U.S. Cl. ............. 252/519.2; 252/519.21; 252/521.3; 428/405; 313/503

(58) Field of Classification Search ............... 252/519.2, 252/519.21, 521.3; 428/405; 313/503
See application file for complete search history.

(56) References Cited

U.S. PATENT DOCUMENTS

| | | | |
|---|---|---|---|
| 4,107,068 A * | 8/1978 | Prokai et al. ............. | 252/182.18 |
| 6,946,597 B2 * | 9/2005 | Sager et al. .................... | 136/263 |
| 7,867,557 B2 * | 1/2011 | Pickett et al. .................. | 427/214 |
| 7,888,700 B2 * | 2/2011 | Kahen .............................. | 257/103 |
| 7,964,279 B2 * | 6/2011 | Kim et al. ....................... | 428/403 |
| 2003/0003300 A1 * | 1/2003 | Korgel et al. .................. | 428/402 |
| 2004/0017834 A1 * | 1/2004 | Sundar et al. ................... | 372/39 |
| 2004/0105980 A1 * | 6/2004 | Sudarshan et al. ............ | 428/404 |
| 2005/0006800 A1 * | 1/2005 | Mountziaris et al. .......... | 264/4.1 |
| 2005/0107478 A1 * | 5/2005 | Klimov et al. .................. | 516/98 |
| 2006/0029802 A1 * | 2/2006 | Ying et al. ..................... | 428/403 |
| 2006/0068203 A1 * | 3/2006 | Ying et al. ..................... | 428/403 |
| 2006/0135669 A1 | 6/2006 | Ryang | |
| 2006/0167147 A1 * | 7/2006 | Asgari .......................... | 524/174 |
| 2006/0199886 A1 | 9/2006 | Ryang | |
| 2006/0240590 A1 * | 10/2006 | Mountziaris et al. ........... | 438/99 |

FOREIGN PATENT DOCUMENTS

| | | |
|---|---|---|
| KR | 1020050021881 A | 3/2005 |
| WO | 2005049711 A3 | 6/2005 |
| WO | 2005067524 | 7/2005 |
| WO | 2006010388 A1 | 2/2006 |

OTHER PUBLICATIONS

Extended European Search Report for application No. 08163169.9-1218/2034002 dated Feb. 1, 2011.

* cited by examiner

*Primary Examiner* — Douglas McGinty
(74) *Attorney, Agent, or Firm* — Cantor Colburn LLP (57) ABSTRACT

Disclosed herein are nanocrystal-metal oxide composites. The composites comprise nanocrystals and a metal oxide bound to the nanocrystals wherein the metal oxide has organic groups. The composites are stable to mechanical stress and exhibit improved processability. Also disclosed herein is a method for preparing the composites.

16 Claims, 4 Drawing Sheets

NANOCRYSTAL-METAL OXIDE COMPOSITES AND PREPARATION METHOD THEREOF

This application claims priority to Korean patent application No. 2007-89535, filed on Sep. 4, 2007, and Korean patent application No. 2007-114329, filed on Nov. 9, 2007, and all the benefits accruing therefrom under U.S.C. §119, the contents of which are incorporated herein by reference in its entirety.

BACKGROUND

1. Field

This disclosure is directed to nanocrystal-metal oxide composites and a method for preparing the composites. More specifically, the nanocrystal-metal oxide composites comprise nanocrystals and a metal oxide bound to the nanocrystals wherein the metal oxide has organic groups.

2. Description of the Related Art

In general, the luminescence and electrical properties of nanocrystals can be controlled by varying various factors (e.g., size and composition) of the nanocrystals. Such characteristics make nanocrystals excellent candidates for application in light-emitting devices, solar cells, sensors, memory devices, and the like.

Nanocrystals may be dispersed in a transparent metal oxide matrix to prepare composites. Use of nanocrystal composites can prevent the constituent nanocrystals from being oxidized or from aggregating due to external stimuli, thereby enhancing the stability of the nanocrystals.

The surface of a nanocrystal prepared by a wet process is covered by an organic dispersant. Before a mixture of such nanocrystals and a metal oxide matrix precursor can undergo a sol-gel reaction to prepare nanocrystal-metal oxide composites, the organic dispersant is replaced with a surfactant having reactivity toward the metal oxide precursor.

The addition of a catalyst and water to the mixture induces crosslinking between the nanocrystals and the metal oxide precursor to form alcohol, water, halogen, or the like, which can cause considerable shrinkage in the volume of the resulting composites.

This volume shrinkage acts to apply mechanical stress to the composites, which can leave defects such as cracks and pores within the composites. Such defects become factors that can cause deterioration of the stability and processability of the composites.

BRIEF SUMMARY

Accordingly, disclosed herein are nanocrystal-metal oxide composites comprising nanocrystals and a metal oxide bound to the nanocrystals wherein the metal oxide has organic groups.

Also disclosed is a method for preparing nanocrystal-metal oxide composites, comprising modifying surfaces of nanocrystals with a surfactant and mixing the surface-modified nanocrystals with a metal oxide precursor having organic groups, a solvent, and water to form a sol-gel, wherein the surfactant is reactive with the metal oxide precursor.

BRIEF DESCRIPTION OF THE DRAWINGS

Exemplary embodiments will be more clearly understood from the following detailed description taken in conjunction with the accompanying drawings, wherein.

DETAILED DESCRIPTION

Hereinafter, a detailed description will be given of example embodiments with reference to the accompanying drawings.

It will be understood that when an element or layer is referred to as being "on," "interposed," "disposed," or "between" another element or layer, it can be directly on, interposed, disposed, or between the other element or layer or intervening elements or layers may be present.

It will be understood that, although the terms first, second, third, and the like may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, first element, component, region, layer or section may be termed as a second element, component, region, layer or section without departing from the teachings of the present invention.

As used herein, the singular forms "a," "an" and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to one embodiment, there are provided nanocrystal-metal oxide composites comprising nanocrystals and a metal oxide bound to the nanocrystals wherein the metal oxide has organic groups.

The metal oxide is a compound represented by Formula 1:

$$A\text{-}(R^1)_k\text{-}O\text{-}B \qquad (1)$$

wherein A is N, NH, S, COO$^-$, PO$_3$H$^-$ or PO$_3^{2-}$,

R$^1$ is an alkyl group containing at least one carbon atom, an alkenyl group containing at least two carbon atoms, or a cyclic group containing at least three carbon atoms, B is one or more repeating units selected from the group consisting of wherein each M is Ti, Zn, Si, Sn, W, Ta, Zr, Hf, Al, Y, Fe, Ce or Cr, $R^2$, $R^3$ and $R^4$ are each independently an alkyl group containing at least one carbon atom, an alkenyl group containing at least two carbon atoms, or a heterocyclic group containing at least three carbon atoms and at least one heteroatom selected from the group consisting of N, S, O and P, k is an integer from 1 to 20, l, m, and n are each independently an integer including 0 and at least one of l, m, or n is greater than 0, and x, y, and z are each independently an integer from 1 to 3. It will be understood that where A is N, NH, and S, the unspecified valencies other than that bound to $R^1$ are bound to the surface of the nanocrystal.

In Formula 1, the repeating units B may be arranged in any order. The metal elements of the repeating units B may be identical to or different from each other. That is, two or more repeating units containing the same or different metal elements may be arranged in any order in the compound of Formula 1. x, y and z corresponding to the numbers of the oxygen atoms capable of bonding to the respective metal elements may vary depending on the kind of the metal elements.

The surfactant of the exemplary embodiments may be one of compounds represented by Formulas 2 to 4 below:

(2)

wherein A' is $NH_2$, SH, COOH or $PO_3H_2$,

$R^1$ is an alkyl group containing at least one carbon atom, an alkenyl group containing at least two carbon atoms, or a cyclic group containing at least three carbon atoms, M is Ti, Zn, Si, Sn, W, Ta, Zr, Hf, Al, Y, Fe, Ce or Cr, $R^2$, $R^3$ and $R^4$ are each independently an alkyl group containing at least one carbon atom, an alkenyl group containing at least two carbon atoms, or a heterocyclic group containing at least three carbon atoms and at least one heteroatom selected from the group consisting of N, S, O and P, k is an integer from 1 to 20, and l, m, and n are each independently an integer including 0 and at least one of l, m, or n is greater than 0;

(3)

wherein A' is $NH_2$, SH, COOH or $PO_3H_2$,

$R^1$ is an alkyl group containing at least one carbon atom, an alkenyl group containing at least two carbon atoms, or a cyclic group containing at least three carbon atoms, M is Ti, Zn, Si, Sn, W, Ta, Zr, Hf, Al, Y, Fe, Ce or Cr, $R^2$ is an alkyl group containing at least one carbon atom, an alkenyl group containing at least two carbon atoms, or a heterocyclic group containing at least three carbon atoms and at least one heteroatom selected from the group consisting of N, S, O and P, k is an integer from 1 to 20, and l and m are each independently an integer including 0 and at least one of l or m is greater than 0; and (4)

wherein A' is $NH_2$, SH, COOH or $PO_3H_2$, $R^1$ is an alkyl group containing at least one carbon atom, an alkenyl group containing at least two carbon atoms, or a cyclic group containing at least three carbon atoms, M is Ti, Zn, Si, Sn, W, Ta, Zr, Hf, Al, Y, Fe, Ce or Cr, $R^2$, $R^3$ and $R^4$ are each independently an alkyl group containing at least one carbon atom, an alkenyl group containing at least two carbon atoms, or a heterocyclic group containing at least three carbon atoms and at least one heteroatom selected from the group consisting of N, S, O and P, k is an integer from 1 to 20, and l, m, and n are each independently an integer including 0 and at least one of l, m, or n is greater than 0.

The nanocrystals may be metal nanocrystals or semiconductor nanocrystals selected from the group consisting of Group II-VI compounds, Group III-V compounds, Group IV-VI compounds, Group IV compounds, and mixtures thereof.

Specifically, the Group II-VI compounds are selected from the group consisting of, but not limited to: binary compounds, such as CdS, CdSe, CdTe, ZnS, ZnSe, ZnTe, ZnO, HgS, HgSe and HgTe; ternary compounds, such as CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS and HgZnSe; and quaternary compounds, such as CdZnSeS, CdZnSeTe, CdZnSTe, CdHgSeS, CdHgSeTe, CdHgSTe, HgZnSeS, HgZnSeTe and HgZnSTe, the Group III-V compounds are selected from the group consisting of, but not limited to: binary compounds, such as GaN, GaP, GaAs, GaSb, AlN, AlP, AlAs, AlSb, InN, InP, InAs and InSb; ternary compounds, such as GaNP, GaNAs, GaNSb, GaPAs, GaPSb, AlNP, AlNAs, AlNSb, AlPAs, AlPSb, InNP, InNAs, InNSb, InPAs, InPSb, GaAlNP, AlGaN, AlGaP, AlGaAs, AlGaSb, InGaN, InGaP, InGaAs, InGaSb, AlInN, AlInP, AlInAs and AlInSb; and quaternary compounds, such as GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs and InAlPSb, the Group IV-VI compounds are selected from the group consisting of, but not limited to: binary compounds, such as SnS, SnSe, SnTe, PbS, PbSe and PbTe; ternary compounds, such as SnSeS, SnSeTe, SnSTe, PbSeS, PbSeTe, PbSTe, SnPbS, SnPbSe and SnPbTe; and quaternary compounds, such as SnPbSSe, SnPbSeTe and SnPbSTe, and the Group IV compounds are selected from the group consisting of, but not limited to: elements such as Si and Ge; and binary compounds, such as SiC and SiGe.

The semiconductor nanocrystals may further include an overcoating to form a core-shell structure. The overcoating may be formed of a material selected from the group consisting of Group II-VI compounds, Group III-V compounds, Group IV-VI compounds, Group IV compounds, and mixtures thereof.

Specifically, the Group II-VI compounds can be selected from the group consisting of, but not limited to, binary compounds, such as CdS, CdSe, CdTe, ZnS, ZnSe, ZnTe, ZnO, HgS, HgSe and HgTe, ternary compounds, such as CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS and HgZnSe, and quaternary compounds, such as CdZnSeS, CdZnSeTe, CdZnSTe, CdHgSeS, CdHgSeTe, CdHgSTe, HgZnSeS, HgZnSeTe and HgZnSTe.

The Group III-V compounds can be selected from the group consisting of, but not limited to, binary compounds, such as GaN, GaP, GaAs, GaSb, AlN, AlP, AlAs, AlSb, InN, InP, InAs and InSb, ternary compounds, such as GaNP, GaNAs, GaNSb, GaPAs, GaPSb, AlNP, AlNAs, AlNSb, AlPAs, AlPSb, InNP, InNAs, InNSb, InPAs, InPSb, GaAlNP, AlGaN, AlGaP, AlGaAs, AlGaSb, InGaN, InGaP, InGaAs, InGaSb, AlInN, AlInP, AlInAs and AlInSb, and quaternary compounds, such as GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs and InAlPSb.

The Group IV-VI compounds can be selected from the group consisting of, but not limited to, binary compounds, such as SnS, SnSe, SnTe, PbS, PbSe and PbTe, ternary compounds, such as SnSeS, SnSeTe, SnSTe, PbSeS, PbSeTe, PbSTe, SnPbS, SnPbSe and SnPbTe, and quaternary compounds, such as SnPbSSe, SnPbSeTe and SnPbSTe; and the Group IV compounds can be selected from the group consisting of, but not limited to, elements such as Si and Ge, and binary compounds, e.g., SiC and SiGe.

The elasticity of the organic groups provides improved processability and mechanical stability to the nanocrystal-metal oxide composites. The metal-carbon bonds formed within the nanocrystal-metal oxide composites are relatively stable against heat and photons. Therefore, the nanocrystal-metal oxide composites exhibit excellent stability to heat and light.

In accordance with another embodiment, there is provided a method for preparing nanocrystal-metal oxide composites.

Specifically, the method comprises modifying the surface of nanocrystals with a surfactant and mixing the surface-modified nanocrystals with a metal oxide precursor having organic groups, a solvent and water to form a sol-gel wherein the surfactant is reactive with the metal oxide precursor.

A known metal oxide precursor may be further added during mixing in the second step. That is, the surface-modified nanocrystals may be mixed with two kinds of metal oxide precursors in the second step.

The nanocrystals used in the first step of the method may be those surrounded by a hydrophobic surfactant. Preferably, the hydrophobic surfactant may possess a group that is reactive with the metal oxide precursor.

The metal oxide precursor having organic groups used in the method can be selected from the group consisting of organosiloxane compounds, organosilane compounds, silsesquioxane compounds, and metal oxides having organic groups. Examples of the metal oxides include titanium, aluminum, vanadium, zinc, tin, tantalum, cerium and chromium oxides.

The organosiloxane compounds may be selected from the group consisting of bis(triethoxysilyl)ethane, bis(triethoxysilyl)butane, bis(triethoxysilyl)octane, bis(trimethoxysilyl)ethane, bis(trimethoxysilyl)butane, bis(trimethoxysilyl)octane, bis(triethoxysilyl)ethylene, bis(trimethoxysilyl)ethylene, bis(triethoxysilyl)acetylene, bis(trimethoxysilyl)acetylene, 1,3,5-tris(diethoxysila)cyclohexane, and 1,3,5-tris(triethoxysilyl)benzene.

The organosilane compounds may be selected from the group consisting of methyltrimethoxysilane, dimethyldimethoxysilane, propyltrimethoxysilane, propyltriethoxysilane, dipropyldimethoxysilane, octyltrimethoxysilane, octyltriethoxysilane, dioctyldimethoxysilane, and hexadecyltriethoxysilane.

The silsesquioxane compound may be 2,4,6,8-tetramethyl-2,4,6,8-tetra(trimethoxysilylethoxy)cyclotetrasiloxane.

The nanocrystals may be metal nanocrystals or semiconductor nanocrystals selected from the group consisting of Group II-VI compounds, Group III-V compounds, Group IV-VI compounds, Group IV compounds, and mixtures thereof.

Specifically, the Group II-VI compounds are selected from the group consisting of, but not limited to: binary compounds, such as CdS, CdSe, CdTe, ZnS, ZnSe, ZnTe, ZnO, HgS, HgSe and HgTe; ternary compounds, such as CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS and HgZnSe; and quaternary compounds, such as CdZnSeS, CdZnSeTe, CdZnSTe, CdHgSeS, CdHgSeTe, CdHgSTe, HgZnSeS, HgZnSeTe and HgZnSTe, the Group III-V compounds are selected from the group consisting of, but not limited to: binary compounds, such as GaN, GaP, GaAs, GaSb, AlN, AlP, AlAs, AlSb, InN, InP, InAs and InSb; ternary compounds, such as GaNP, GaNAs, GaNSb, GaPAs, GaPSb, AlNP, AlNAs, AlNSb, AlPAs, AlPSb, InNP, InNAs, InNSb, InPAs, InPSb, GaAlNP, AlGaN, AlGaP, AlGaAs, AlGaSb, InGaN, InGaP, InGaAs, InGaSb, AlInN, AlInP, AlInAs and AlInSb; and quaternary compounds, such as GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs and InAlPSb, the Group IV-VI compounds are selected from the group consisting of, but not necessarily limited to: binary compounds, such as SnS, SnSe, SnTe, PbS, PbSe and PbTe; ternary compounds, such as SnSeS, SnSeTe, SnSTe, PbSeS, PbSeTe, PbSTe, SnPbS, SnPbSe and SnPbTe; and quaternary compounds, such as SnPbSSe, SnPbSeTe and SnPbSTe, and the Group IV compounds are selected from the group consisting of, but not necessarily limited to: elements such as Si and Ge; and binary compounds, such as SiC and SiGe.

The semiconductor nanocrystals may further include an overcoating to form a core-shell structure. The overcoating may be formed of a material selected from the group consisting of Group II-VI compounds, Group III-V compounds, Group IV-VI compounds, Group IV compounds, and mixtures thereof.

Specifically, the Group II-VI compounds can be selected from the group consisting of, but not limited to, binary compounds, e.g., CdS, CdSe, CdTe, ZnS, ZnSe, ZnTe, ZnO, HgS, HgSe and HgTe, ternary compounds, such as CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS and HgZnSe, and quaternary compounds, such as CdZnSeS, CdZnSeTe, CdZnSTe, CdHgSeS, CdHgSeTe, CdHgSTe, HgZnSeS, HgZnSeTe and HgZnSTe.

The Group III-V compounds can be selected from the group consisting of, but are not limited to, binary compounds, such as GaN, GaP, GaAs, GaSb, AlN, AlP, AlAs, AlSb, InN, InP, InAs and InSb, ternary compounds, such as GaNP, GaNAs, GaNSb, GaPAs, GaPSb, AlNP, AlNAs, AlNSb, AlPAs, AlPSb, InNP, InNAs, InNSb, InPAs, InPSb, GaAlNP, AlGaN, AlGaP, AlGaAs, AlGaSb, InGaN, InGaP, InGaAs, InGaSb, AlInN, AlInP, AlInAs and AlInSb, and quaternary compounds, such as GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs and InAlPSb.

The Group IV-VI compounds can be selected from the group consisting of, but are not limited to, binary compounds, such as SnS, SnSe, SnTe, PbS, PbSe and PbTe, ternary compounds, such as SnSeS, SnSeTe, SnSTe, PbSeS, PbSeTe, PbSTe, SnPbS, SnPbSe and SnPbTe, and quaternary compounds, such as SnPbSSe, SnPbSeTe and SnPbSTe; and the Group IV compounds can be selected from the group consisting of, but are not limited to, elements such as Si and Ge, and binary compounds, such as SiC and SiGe.

The solvent used in the second step may be a polar solvent selected from the group consisting of alkanols having up to 20 carbon atoms, including methanol, ethanol and propanol, acetone, ethyl acetate, dichloromethane, chloroform, dimethylformamide ("DMF"), tetrahydrofuran ("THF"), dimethylsulfoxide ("DMSO"), pyridine, and alkylamines having up to 20 carbon atoms.

The addition of a catalyst and water to the mixture of the surface-modified nanocrystals and the metal oxide precursor induces crosslinking between the nanocrystals and the metal oxide precursor to form alcohol, water, halogen, and other by-products, which cause a considerable shrinkage in the volume of the final composites. This volume shrinkage can induce mechanical stress in the composites, which can lead to many different kinds of defects such as cracks and pores within the composites.

The nanocrystal-metal oxide composites having organic groups, and in particular the $R^1$ groups included in the metal oxide precursor, impart elasticity to the composite to achieve improved processability and mechanical stability.

In addition, another advantage associated with the use of the metal oxide precursor having organic groups is that the affinity of the metal oxide precursor for the nanocrystals is improved, making the nanocrystals more readily dispersible. The nanocrystal-metal oxide composites may subsequently be easily molded and cured to form a nanocrystal-metal oxide monolith.

The nanocrystal-metal oxide composites may be coated on the light-emitting surface of a light-emitting diode chip of a light-emitting device (e.g., a light-emitting diode ("LED")). The nanocrystal-metal oxide composites may be directly coated on a device (e.g., a sensor or a solar cell) that uses nanocrystals.

The nanocrystal-metal oxide monolith may be mounted on the light-emitting surface of a light-emitting diode chip.

The nanocrystal-metal oxide monolith may be a monolayer or have a multilayer structure having two or more layers.

A better understanding of exemplary embodiments will be described in more detail with reference to the following examples. It will be noted that these examples are provided only for the purpose of illustration and are not to be construed as limiting the scope of the embodiments thereto.

EXAMPLES

Preparative Example 1

Preparation of CdSe//ZnS/CdSZnS Nanocrystals 16 g of trioctylamine ("TOA"), 0.3 g of octadecylphosphonic acid and 0.4 mmol of cadmium oxide were simultaneously put into a 125-ml flask equipped with a reflux condenser. The mixture was allowed to react with stirring while maintaining the reaction temperature at 300° C. to obtain a reaction mixture.

Separately, selenium (Se) powder was dissolved in trioctylphosphine ("TOP") to obtain a Se-TOP complex solution (Se concentration: ca. 2 M). 2 ml of the Se-TOP complex solution was rapidly fed to the reaction mixture and the reaction was allowed to proceed for about 2 minutes.

After the reaction was finished, the reaction mixture was cooled to room temperature as rapidly as possible. Ethanol as a non-solvent was added to the reaction mixture in an amount sufficient to precipitate the reaction product, followed by centrifugation. The precipitate was separated from the supernatant and dispersed in 4 ml toluene to prepare a dispersion of CdSe nanocrystals emitting light at 485 nm.

Next, 8 g of TOA, 0.1 g of oleic acid and 0.4 mmol of zinc acetate were simultaneously put into a 125-mL flask equipped with a reflux condenser. The mixture was allowed to react with stirring while maintaining the reaction temperature at 300° C. to obtain a reaction mixture. The CdSe nanocrystal solution was added to the reaction mixture, and then 2 ml of 0.4M S-TOP complex solution was slowly added thereto. The resulting mixture was allowed to react for about one hour to grow ZnS nanocrystals on the surface of the CdSe nanocrystals and interdiffuse a portion of the ZnS nanocrystals into the CdSe nanocrystal along the interface between the CdSe and ZnS nanocrystals to form an alloy interlayer at the interface. As a result, CdSe/ZnS nanocrystals having the alloy interlayer formed at the interface between the CdSe and ZnS nanocrystals (hereinafter, referred to as 'CdSe//ZnS nanocrystals') were prepared.

After completion of the reaction, the reaction mixture was cooled to room temperature as rapidly as possible. Ethanol as a non-solvent was added in an amount sufficient to precipitate the reaction product from the reaction mixture, followed by centrifugation. The precipitate was separated from the supernatant and dispersed in 2 ml toluene to prepare a dispersion of the CdSe//ZnS nanocrystals. The CdSe//ZnS nanocrystals had a size of 5 nm and emitted light at 458 nm.

8 g of TOA, 0.1 g of oleic acid, 0.05 mmol of cadmium oxide and 0.4 mmol of zinc acetate were simultaneously put into a 125-mL flask equipped with a reflux condenser. The mixture was allowed to react with stirring while maintaining the reaction temperature at 300° C. to obtain a reaction mixture. The solution of the CdSe//ZnS nanocrystals was added to the reaction mixture, and then 2 ml of an 0.4M S-TOP complex solution was slowly added thereto. The resulting mixture was allowed to react for about one hour to grow CdSZnS nanocrystals on the surface of the CdSe//ZnS nanocrystals. As a result, CdSe//ZnS/CdSZnS nanocrystals emitting light at 535 nm were prepared.

Figure 1:
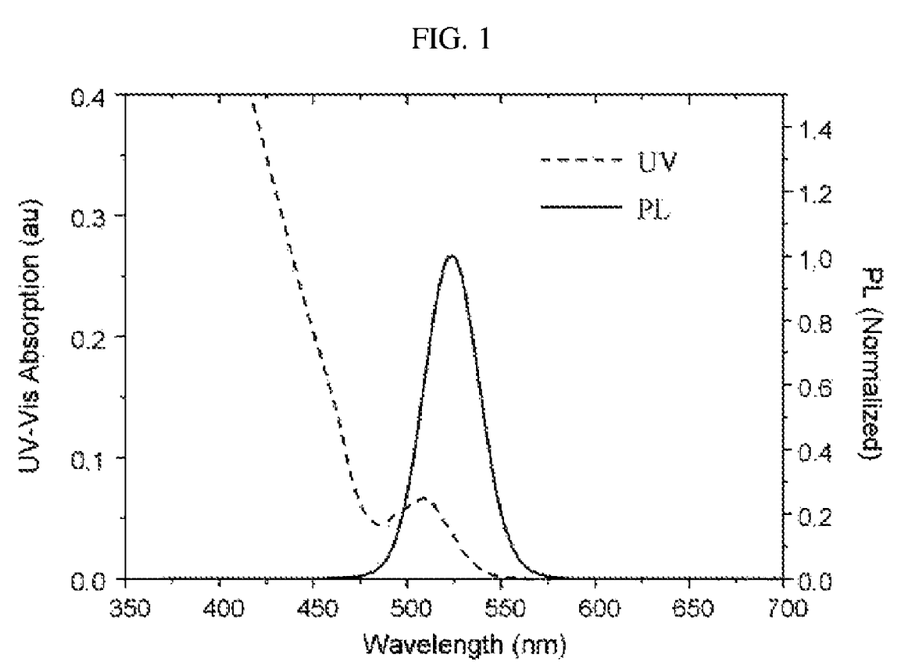
FIG. 1 shows absorption and luminescence spectra of exemplary nanocrystals prepared in Preparative Example 1.

After completion of the reaction, the reaction mixture was cooled to room temperature as rapidly as possible. Ethanol as a non-solvent was added in an amount sufficient to precipitate the reaction mixture, followed by centrifugation. The precipitate was separated from the supernatant and dispersed in 2 ml toluene to prepare a dispersion of the CdSe//ZnS/CdSZnS nanocrystals. The nanocrystals were found to have a quantum efficiency of 93%. The absorption and luminescence spectra of the nanocrystals are shown in FIG. 1.

Example 1

Preparation of Nanocrystals-Silica Composites Containing Organosiloxane

Ethanol was added in an amount sufficient to induce precipitation in 1 mL of the toluene solution of the green emitting CdSe//ZnS/CdSZnS (nanocrystal concentration 1 wt %) prepared in Preparative Example 1, followed by centrifugation to obtain a precipitate. The precipitate was collected. Pyridine 1 ml was added to the precipitate and stirred until the solution became transparent.

Hexane was added to the pyridine solution of the nanocrystals in an amount sufficient to obtain a precipitate. The precipitate was collected, dissolved in a 10 vol % pyridine solution of 1:1 mole ratio of 6-mercaptohexanol and propylamine, and stirred for about 2 hours.

The addition of a sufficient amount of hexane to the solution gave a precipitate. 100 µl of tetraethoxyorthosilane ("TEOS"), 100 µl of 1,3,5-tris(diethoxysila)cyclohexane, 100 µl of ethanol, 100 µl of propylamine and 50 µl of water were added to the precipitate, stirred, put into a vial, and dried at room temperature to prepare CdSe//ZnS/CdSZnS nanocrystals-silica composites.

Figure 2:
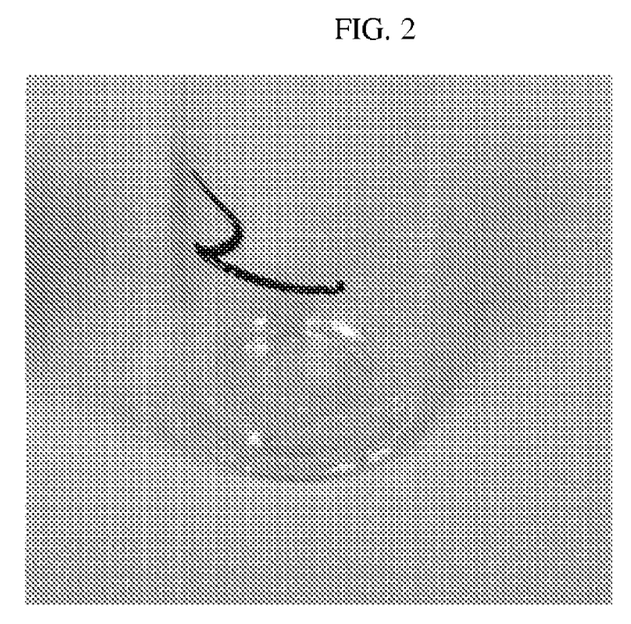
FIG. 2 is a photograph showing the shape of exemplary composites prepared in Example 1 after curing.

The composites were cured. FIG. 2 shows the shape of the cured composites. FIG. 2 demonstrates that the shape of the cured composites was well maintained.

Example 2

Preparation of Nanocrystals-Silica Composites Containing Organosiloxane

Ethanol was added in an amount sufficient to induce precipitation in 1 ml of the toluene solution of the green emitting CdSe//ZnS/CdSZnS (nanocrystal concentration 1 wt %) prepared in Preparative Example 1, followed by centrifugation to obtain a precipitate. The precipitate was collected. Pyridine 1 ml was added to the precipitate and stirred until the solution became transparent.

Hexane was added to the pyridine solution of the nanocrystals in an amount sufficient to obtain a precipitate. The precipitate was collected, dissolved in a 10 vol % pyridine solution of 1:1 mole ratio of 6-mercaptohexanol and propylamine, and stirred for about 2 hours.

The addition of hexane to the solution gave a precipitate. 100 µl of tetraethoxyorthosilane ("TEOS"), 100 µl of bis(triethoxysilyl)octane, 100 µl of ethanol, 100 µl of propylamine and 50 µl of water were added to the precipitate, stirred, put into a vial, and dried at room temperature to prepare CdSe//ZnS/CdSZnS nanocrystals-silica composite.

Comparative Example 1

Preparation of Nanocrystals-Silica Composites

Ethanol was added to 1 mL of the toluene solution of the green emitting CdSe//ZnS/CdSZnS (nanocrystal concentration 1 wt %) prepared in Preparative Example 1, followed by centrifugation to obtain a precipitate. The precipitate was collected. Pyridine 1 ml was added to the precipitate and stirred until the solution became transparent.

Hexane was added to the pyridine solution of the nanocrystals in an amount sufficient to obtain a precipitate. The precipitate was collected, dissolved in a 10 vol % pyridine solution of 1:1 mole ratio of 6-mercaptohexanol and propylamine and stirred for about 2 hours.

The addition of hexane to the solution in a sufficient amount gave a precipitate. 200 µl of tetraethoxyorthosilane (TEOS), 100 µl of ethanol, 100 µl of propylamine and 50 µl of water were added to the precipitate, stirred, put into a vial, and dried at room temperature to prepare CdSe//ZnS/CdSZnS nanocrystals-silica composite.

Figure 3:
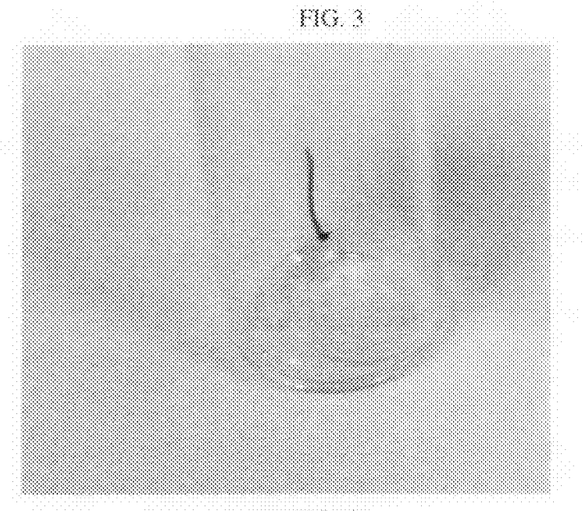
FIG. 3 is a photograph showing the shape of exemplary composites prepared in Comparative Example 1 after curing.

Cracks were formed in the composites of the Comparative Example 1 during curing. FIG. 3 shows the shape of the cured composites of Comparative Example 1, and demonstrates that the composites lost their shape due to the formation of cracks during curing, unlike the composites prepared in Example 1.

Experimental Example 1

Figure 4A:
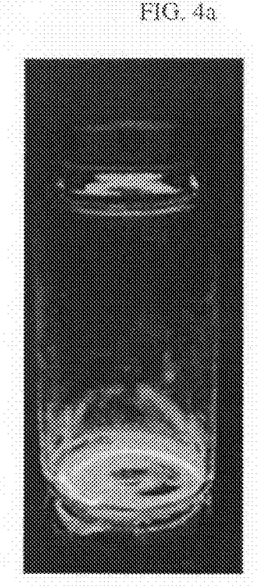
FIG. 4a is a photograph showing the variation in the volume of exemplary composites prepared in Example 2 after curing.
Figure 4B:
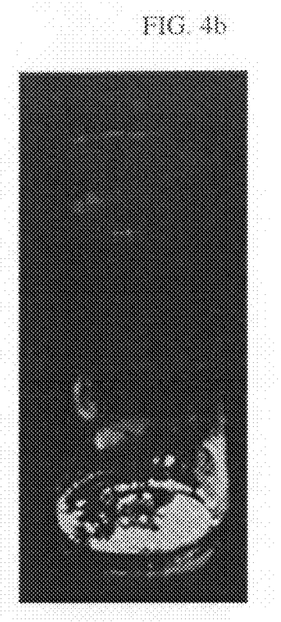
FIG. 4b is a photograph showing the variation in the volume of exemplary composites prepared in Comparative Example 1 after curing.
Figure 5:
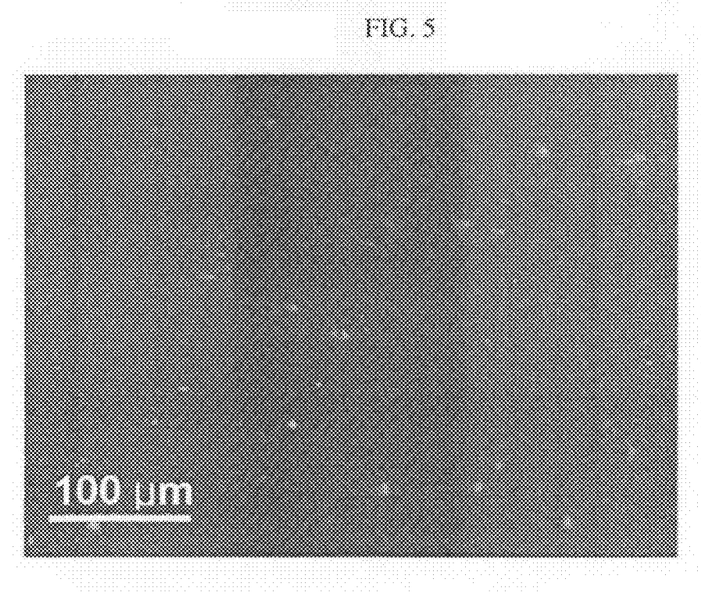
FIG. 5 is an optical microscopy image of exemplary composites prepared in Example 2 after curing.
Figure 6:
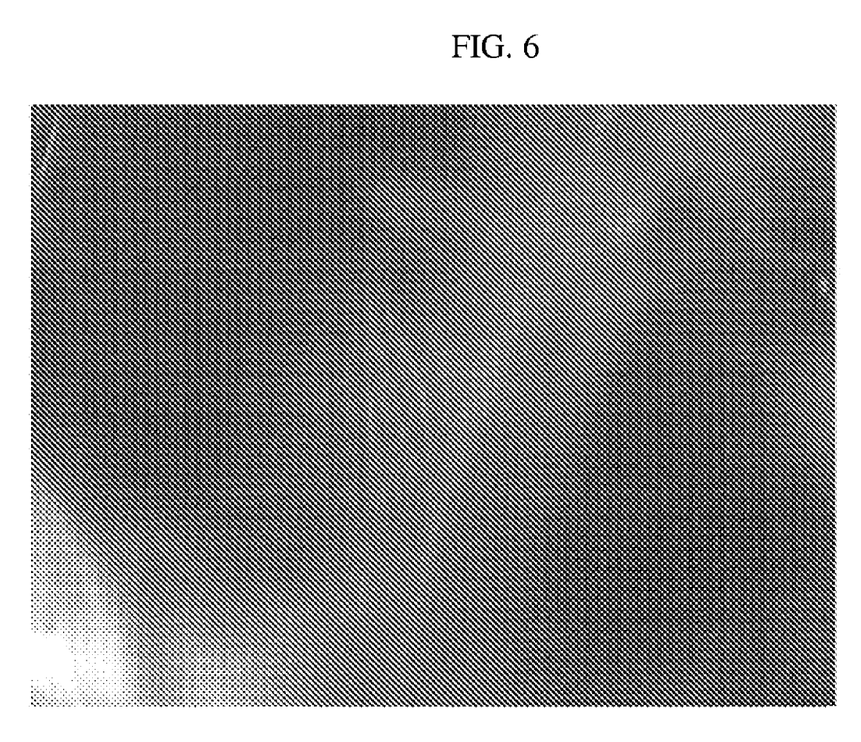
FIG. 6 is an optical microscopy image of exemplary composites prepared in Comparative Example 1 after curing.

The composites and the monolith prepared in each of Example 2 and Comparative Example 1 were cured and observed for light emission under a 365 nm-UV lamp (FIGS. 4a and 4b). Optical microscopy images of the cured composites and monolith are shown in FIGS. 5 and 6, respectively. FIGS. 4a and 4b demonstrate that shrinkage in the volume of the cured composites of Example 2 was much lower due to the presence of the long alkyl chains (as obtained from the bis(triethoxysilyl)octane used in the formation of the nanocrystal silica composite of Example 2)) than that of the cured monolith of Comparative Example 1. The images of FIGS. 5 and 6 show that no cracks were observed in the cured composites of Example 2 whereas cracks were observed in the cured monolith of Comparative Example 1.

While the present invention has been described in detail with reference to its preferred embodiments, the embodiments are simply for the purpose of illustration. It will be understood by those skilled in the art that various modifications and their equivalents can be made in the present invention without departing from the spirit and scope of the invention. Thus, the genuine scope of the technical protection of the present invention should be defined by the spirit of the claims that follow.

What is claimed is:

1. A nanocrystal-metal oxide composite comprising a nanocrystal and a metal oxide bound to the nanocrystal wherein the metal oxide comprises a compound represented by Formula 1:

$$A\text{-}(R^1)_k\text{-}O\text{-}B \quad (1)$$

wherein A is N, NH, S, COO$^-$, PO$_3$H$^-$ or PO$_3^{2-}$,

R$^1$ is an alkyl group containing at least one carbon atom, an alkenyl group containing at least two carbon atoms, or a cyclic group containing at least three carbon atoms, B is one or more repeating units selected from the group consisting of $-(MO_yR^2)_m$, and $-(MO_zR^3R^4)_n$;

wherein each M is Ti, Zn, Si, Sn, W, Ta, Zr, Hf, Al, Y, Fe, Ce or Cr,

R$^2$, R$^3$ and R$^4$ are each independently an alkyl group containing at least one carbon atom, an alkenyl group containing at least two carbon atoms, or a heterocyclic group containing at least three carbon atoms and at least one heteroatom selected from the group consisting of N, S, O and P, k is an integer from 1 to 20, l, m, and n are each independently an integer including 0 and at least one of l, m, or n is greater than 0, and x, y, and z are each independently an integer from 1 to 3.

2. A method for preparing nanocrystal-metal oxide composites, the method comprising:

modifying the surface of nanocrystals with a surfactant to provide surface-modified nanocrystals, and mixing the surface-modified nanocrystals with a metal oxide precursor having organic groups, a solvent and water to form a sol-gel, wherein the surfactant is reactive with the metal oxide precursor having organic groups to provide a compound represented by Formula 1:

$$A\text{-}(R^1)_k\text{-}O\text{-}B \quad (1)$$

wherein A is N, NH, S, COO$^-$, PO$_3$H$^-$ or PO$_3^{2-}$,

R$^1$ is an alkyl group containing at least one carbon atom, an alkenyl group containing at least two carbon atoms, or a cyclic group containing at least three carbon atoms, B is one or more repeating units selected from the group consisting of $-(MO_x)_l$, $-(MO_yR^2)_m$, and $-(MO_zR^3R^4)_n$;

wherein each M is Ti, Zn, Si, Sn, W, Ta, Zr, Hf, Al, Y, Fe, Ce or Cr,

R$^2$, R$^3$ and R$^4$ are each independently an alkyl group containing at least one carbon atom, an alkenyl group containing at least two carbon atoms, or a heterocyclic group containing at least three carbon atoms and at least one heteroatom selected from the group consisting of N, S, O and P, k is an integer from 1 to 20, l, m, and n are each independently an integer including 0 and at least one of l, m, or n is greater than 0, and x, y, and z are each independently an integer from 1 to 3.

3. The composite of claim 1, wherein the nanocrystal is a metal nanocrystal or a semiconductor nanocrystal selected from the group consisting of Group II-VI compounds, Group III-V compounds, Group IV-VI compounds, Group IV compounds, and mixtures thereof.

4. The composite of claim 3, wherein the Group II-VI compounds are selected from the group consisting of CdSe, CdTe, ZnS, ZnSe, ZnTe, ZnO, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, CdZnSeS, CdZnSeTe, CdZnSTe, CdHgSeS, CdHgSeTe, CdHgSTe, HgZnSeS, HgZnSeTe, and HgZnSTe; the Group III-V compounds are selected from the group consisting of GaN, GaP, GaAs, GaSb, AN, AlP, AlAs, AlSb, InN, InP, InAs, InSb, GaNP, GaNAs, GaNSb, GaPAs, GaPSb, AlNP, AlNAs, AlNSb, AlPAs, AlPSb, InNP, InNAs, InNSb, InPAs, InPSb, GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, and InAlPSb; the Group IV-VI compounds are selected from the group consisting of SnS, SnSe, SnTe, PbS, PbSe, PbTe, SnSeS, SnSeTe, SnSTe, PbSeS, PbSeTe, PbSTe, SnPbS, SnPbSe, SnPbTe, SnPbSSe, SnPbSeTe, and SnPbSTe; and the Group IV compounds are selected from the group consisting of Si, Ge, SiC, and SiGe.

5. A light-emitting diode device comprising nanocrystal-metal oxide composites wherein the composites include nanocrystals and a compound bound to the nanocrystals, the compound being represented by Formula 1:

(1)

wherein A is N, NH, S, COO$^-$, PO$_3$H$^-$ or PO$_3$$^{2-}$,

R$^1$ is an alkyl group containing at least one carbon atom, an alkenyl group containing at least two carbon atoms, or a cyclic group containing at least three carbon atoms, B is one or more repeating units selected from the group consisting of $-(MO_x)_l\text{-}$, $-(MO_yR^2)_m\text{-}$, and $-(MO_zR^3R^4)_n\text{-}$;

wherein each M is Ti, Zn, Si, Sn, W, Ta, Zr, Hf, Al, Y, Fe, Ce or Cr,

R$^2$, R$^3$ and R$^4$ are each independently an alkyl group containing at least one carbon atom, an alkenyl group containing at least two carbon atoms, or a heterocyclic group containing at least three carbon atoms and at least one heteroatom selected from the group consisting of N, S, O and P, k is an integer from 1 to 20, l, m, and n are each independently an integer including 0 and at least one of l, m, or n is greater than 0, and x, y, and z are each independently an integer from 1 to 3.

6. A method for forming a nanocrystal-metal oxide monolith by solidifying the composites in a sol-gel form prepared by the method of claim 2.

7. The method of claim 2, wherein the nanocrystals used in the first step are those surrounded by a hydrophobic surfactant.

8. The method of claim 2, wherein an additional metal oxide precursor is added during mixing.

9. The method of claim 2, wherein the solvent used in the second step is a polar solvent selected from the group consisting of alkanols, acetone, ethyl acetate, dichloromethane, chloroform, DMF, THF, DMSO, pyridine, and alkylamines.

10. The method of claim 2, wherein the metal oxide precursor having organic groups is selected from the group consisting of organosiloxane compounds, organosilane compounds, silsesquioxane compounds, titanium oxides, aluminum oxides, vanadium oxides, zinc oxides, tin oxides, tantalum oxides, cerium oxides and chromium oxides, having organic groups.

11. The method of claim 10, wherein the organosiloxane compounds are selected from the group consisting of bis(triethoxysilyl)ethane, bis(triethoxysilyl)butane, bis(triethoxysilyl)octane, bis(trimethoxysilyl)ethane, bis(trimethoxysilyl)butane, (trimethoxysilyl)octane, bis(triethoxysilyl)ethylene, bis(trimethoxysilyl)ethylene, bis(triethoxysilyl)acetylene, bis(trimethoxysilyl)acetylene, 1,3,5-tris(diethoxysila)cyclohexane, and 1,3,5-tris(triethoxysilyl)benzene.

12. The method of claim 10, wherein the organosilane compounds are selected from the group consisting of methyltrimethoxysilane, dimethyldimethoxysilane, propyltrimethoxysilane, propyltriethoxysilane, dipropyldimethoxysilane, octyltrimethoxysilane, octyltriethoxysilane, dioctyldimethoxysilane, and hexadecyltriethoxysilane.

13. The method of claim 10, wherein the silsesquioxane compound is 2,4,6,8-tetramethyl-2,4,6,8-tetra(trimethoxysilylethoxy)cyclotetrasiloxane.

14. The method of claim 2, wherein the nanocrystals are metal nanocrystals or semiconductor nanocrystals selected from the group consisting of Group II-VI compounds, Group III-V compounds, Group IV-VI compounds, Group IV compounds, and mixtures thereof.

15. The method of claim 14, wherein the Group II-VI compounds are selected from the group consisting of CdSe, CdTe, ZnS, ZnSe, ZnTe, ZnO, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, including CdZnSeS, CdZnSeTe, CdZnSTe, CdHgSeS, CdHgSeTe, CdHgSTe, HgZnSeS, HgZnSeTe, and HgZnSTe; the Group III-V compounds are selected from the group consisting of GaN, GaP, GaAs, GaSb, AN, AlP, AlAs, AlSb, InN, InP, InAs, InSb, GaNP, GaNAs, GaNSb, GaPAs, GaPSb, AlNP, AlNAs, AlNSb, AlPAs, AlPSb, InNP, InNAs, InNSb, InPAs, InPSb, GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, and InAlPSb; the Group IV-VI compounds are selected from the group consisting of SnS, SnSe, SnTe, PbS, PbSe, PbTe, SnSeS, SnSeTe, SnSTe, PbSeS, PbSeTe, PbSTe, SnPbS, SnPbSe, SnPbTe, SnPbSSe, SnPbSeTe, and SnPbSTe; and the Group IV compounds are selected from the group consisting of Si, Ge, SiC, and SiGe.

16. The method of claim 9, wherein the alkanols include methanol, ethanol, or propanol.

* * * * *